US010599260B1

(12) United States Patent
Salter et al.

(10) Patent No.: US 10,599,260 B1
(45) Date of Patent: Mar. 24, 2020

(54) SYSTEM AND METHODS FOR EXTERIOR VEHICLE DISPLAY

(71) Applicant: Ford Global Technologies, LLC, Dearborn, MI (US)

(72) Inventors: Stuart C. Salter, White Lake, MI (US); Kristopher Karl Brown, Dearborn, MI (US); Annette Lynn Huebner, White Lake, MI (US); David Brian Glickman, Southfield, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 16/166,502

(22) Filed: Oct. 22, 2018

(51) Int. Cl.
| | | |
|---|---|---|
| *G06F 3/041* | (2006.01) | |
| *G06F 3/0488* | (2013.01) | |
| *G02F 1/1335* | (2006.01) | |
| *G02F 1/1333* | (2006.01) | |
| *G06F 3/044* | (2006.01) | |

(52) U.S. Cl.
CPC ...... *G06F 3/0416* (2013.01); *G02F 1/133308* (2013.01); *G02F 1/133603* (2013.01); *G06F 3/044* (2013.01); *G06F 3/0488* (2013.01)

(58) Field of Classification Search
CPC .. B60W 2050/146; B60Q 1/503; G09F 27/00; B61L 2207/00; G06F 3/0412
See application file for complete search history.

(56) References Cited

U.S. PATENT DOCUMENTS

| | | | |
|---|---|---|---|
| 8,994,495 B2 | 3/2015 | Dassanayake et al. | |
| 9,460,575 B2 | 10/2016 | Park et al. | |
| 9,778,687 B1 * | 10/2017 | Rajagopalan | G06F 1/1626 |
| 2009/0150242 A1 | 6/2009 | Del Cogliano | |
| 2012/0303458 A1 | 11/2012 | Schuler, Jr. | |
| 2015/0161836 A1 * | 6/2015 | Park | G06K 9/00355 |
| | | | 340/5.51 |
| 2015/0315839 A1 | 11/2015 | Shigemoto et al. | |
| 2016/0103358 A1 * | 4/2016 | Tanaka | G06F 3/0412 |
| | | | 349/12 |
| 2017/0293386 A1 * | 10/2017 | Seder | G02F 1/133382 |
| 2019/0155450 A1 * | 5/2019 | Kim | G01L 1/146 |
| 2019/0197927 A1 * | 6/2019 | Matsuoka | G09F 21/048 |
| 2019/0351768 A1 * | 11/2019 | Salter | B60K 35/00 |

FOREIGN PATENT DOCUMENTS

| | | |
|---|---|---|
| DE | 102010024573 A1 | 12/2011 |
| EP | 2977291 A1 | 1/2016 |

OTHER PUBLICATIONS

Padeanu, Adrian, "Q8 Concept Has Touch Audi Logo Acting as Door Handle," Jan. 7, 2017, pp. 1-5.
"Platform Screen Doors (PSD)," Railsystem.net, Aug. 8, 2018, pp. 1-3, http://www.railsystem.net/platform-screen-doors-psd/.

* cited by examiner

*Primary Examiner* — Priyank J Shah
(74) *Attorney, Agent, or Firm* — David Coppiellie; Price Heneveld LLP

(57) ABSTRACT

An exterior display apparatus for a vehicle comprises a first display panel in connection with a first door trim portion and a second display panel in connection with a second door trim portion. The first and second door trim portions are adjacent to each other. Each of the display panels comprises a touch sensor and a heater layer distributed over a corresponding display surface.

14 Claims, 5 Drawing Sheets

SYSTEM AND METHODS FOR EXTERIOR VEHICLE DISPLAY

FIELD OF THE DISCLOSURE

The present disclosure generally relates to a display for a vehicle and, more particularly, relates to a display device for an exterior panel or portion of an automotive vehicle.

BACKGROUND OF THE DISCLOSURE

Displays and display technologies may be implemented in a variety of ways to communicate visual information. However, in some applications and environments, the performance of conventional displays may be inadequate. Accordingly, novel designs for display devices may provide for improved operation and performance in adverse or various operating conditions. In general, the disclosure provides for novel systems and methods that may be implemented to improve the operation of display devices.

SUMMARY OF THE DISCLOSURE

According to one aspect of the present disclosure, an exterior display apparatus for a vehicle is disclosed. The apparatus comprises a first display panel in connection with a first door trim portion and a second display panel in connection with a second door trim portion. The first and second door trim portions are adjacent to each other. Each of the display panels comprises a touch sensor and a heater layer distributed over a corresponding display surface.

Embodiments of the first aspect of the disclosure can include any one or a combination of the following features:
- each of the door trim portions are disposed along a perimeter edge of a door;
- at least one of the door trim portions is disposed between the perimeter edge of the door and a window forming a portion of the door;
- the perimeter edge forms a shared boundary between the first display panel and the second display panel along the perimeter edges of the doors;
- each of the display panels comprises a rear shell in thermal connection with an outer body panel of a door of the vehicle;
- the rear shell comprises a thermally conductive polymeric material;
- each of the display panels comprises a backlight layer disposed between the rear shell and the heater layer;
- the heater layer comprises a film comprising a plurality of conductive strips distributed over the display surface;
- the touch sensor comprises a capacitive sensor pattern distributed over the display surface; and/or
- further comprising a controller, wherein the controller is configured to detect frozen material on the display surface in response to a signal communicated from the touch sensor.

According to another aspect of the present disclosure, a method for displaying visual data on a panel of a vehicle is disclosed. The method comprises displaying first data on a first display panel and displaying second data on a second display panel. The method further comprises detecting a closed configuration of a plurality of vehicle doors. In response to the closed configuration, the method may continue by displaying a continuous representation of a third image data contiguously over the first display panel and the second display panel.

The embodiments of the second aspect of the disclosure can include any one or a combination of the following features or steps:
- detecting a foreign material on at least one of a first display surface of the first display panel and a second display surface of the second display panel;
- inferring that the foreign substance is frozen based on a temperature proximate the vehicle in combination with the detection of the foreign substance;
- activating a heater apparatus of at least one of the first display panel and the second display panel in response to the inference that the foreign substance is frozen;
- wherein the detecting the foreign substance comprises detecting via a touch screen apparatus at least one of the display panels that the foreign substance is on at least one of the first display surface and the second display surface; and/or
- wherein the detecting the foreign substance comprises detecting the foreign substance via a rain sensor of the vehicle.

According to yet another aspect of the present disclosure, an exterior display apparatus for a vehicle is disclosed. The display apparatus comprises a first display panel connected to a first door trim portion and a second display panel connected to a second door trim portion. The first door trim portion is adjacent to the second door trim portion. Each of the display panels comprises a touch sensor and a heater distributed over a corresponding display surface. The display apparatus further comprises a controller configured to identify a foreign object on one of the display panels via the touch sensor.

The embodiments of the third aspect of the disclosure can include any one or a combination of the following features:
- the controller is further configured to activate the heater in response to the detection of the foreign object;
- the controller is further in communication with a temperature sensor configured to identify a temperature of an environment proximate the vehicle and the controller is further configured to infer that the foreign object is frozen material in response to the temperature identified below a threshold temperature; and/or
- the controller is in communication with a defrost system and configured to activate the heater in response to a defrost state of the defrost system in combination with the detection of the foreign object.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1A:
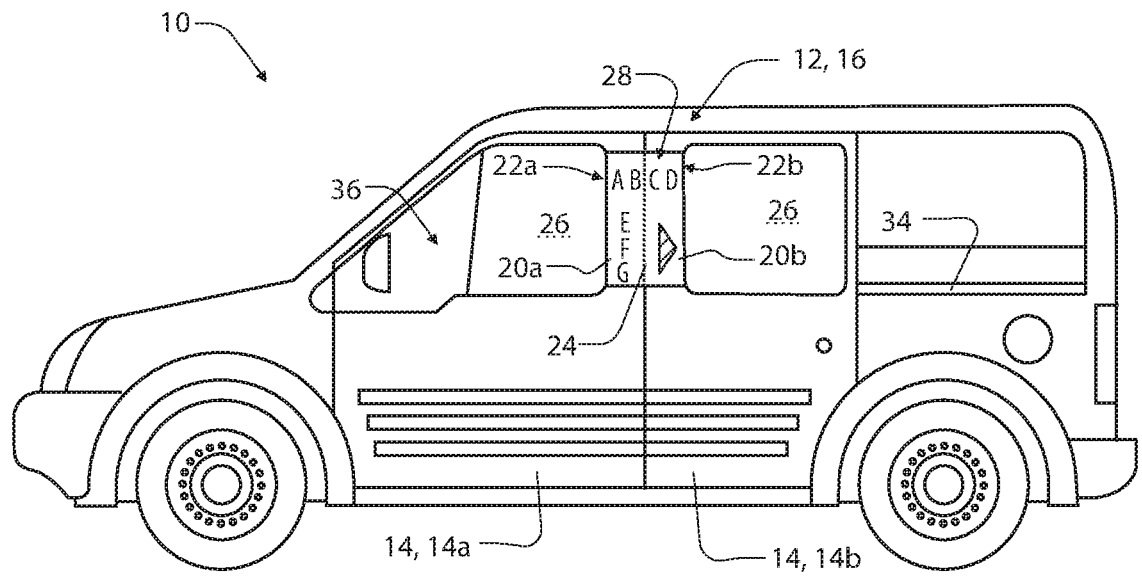
FIG. 1A is a side profile view of a vehicle comprising a display apparatus disposed on a door oriented in a closed position.
Figure 1B:
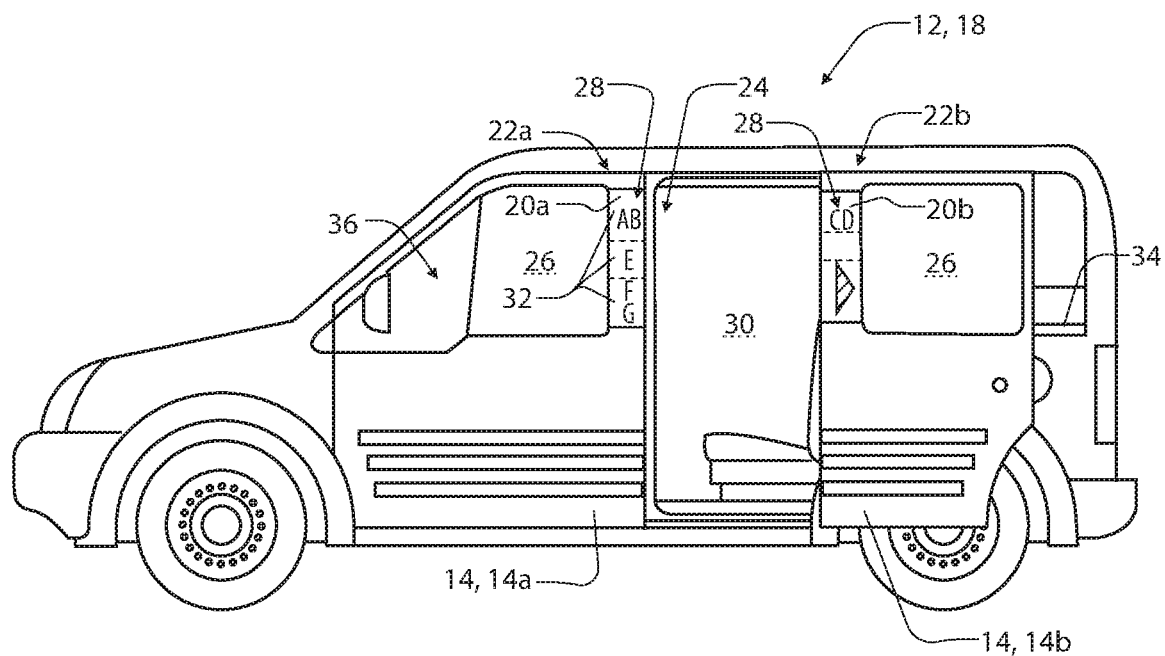
FIG. 1B is a side profile view of a vehicle comprising a display apparatus disposed on a door with the door oriented in an open position.

For purposes of description herein, the terms "upper," "lower," "right," "left," "rear," "front," "vertical," "horizontal," "interior," "exterior," and derivatives thereof shall relate to the device as oriented in FIGS. 1A and 1B. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring to FIGS. 1A and 1B, a side profile view of a vehicle 10 comprising a display apparatus 12 is shown demonstrating at least one door 14 oriented in a closed position 16 and an open position 18, respectively. In various embodiments, the display apparatus 12 may comprise a plurality of display panels 20. The display panels 20 may comprise a first display panel 20a and a second display panel 20b, which may be in connection with and/or form a first door portion 22a and a second door trim portion 22b, respectively. The door trim portions 22a, 22b may be disposed along a perimeter edge 24 formed between a first door 14a and second door 14b. In this configuration, the perimeter edge 24 may form a first boundary of each of the display panels 20 along a first side, and a window 26 disposed in each of the vehicle doors 14 may form a second boundary of each of the display panels 20 along a second side. The display apparatus 12 may provide for each of the display panels 20 to be controlled both independently and in combination to provide and display a variety of visual effects.

As demonstrated in FIG. 1A, in the closed position 16, the display panels 20 may be arranged contiguously side-by-side with the perimeter edge 24 forming a narrow boundary therebetween. In this configuration, a controller of the display apparatus 12 may be configured to display visual information 28 contiguously over the first display panel 20a and the second display panel 20b. Additionally, the controller of the display apparatus 12 may be configured to independently display the visual information 28 on either the first display panel 20a and/or the second display panel 20b selectively. As described herein, the visual information 28 may correspond to image data, video data, graphics and/or rendered graphic data, which may be derived from a variety of sources (e.g. cameras, imagers, stored image or graphic data, and/or dynamically rendered). In this way, the display apparatus 12 may be configured to flexibly display the visual information 28 on one or more of the display panels 20 to provide flexible operation of the display apparatus 12 to suit a variety of applications. The controller of the display apparatus 12 is discussed in further detail in reference to FIG. 6.

As demonstrated in FIG. 1B, when the at least one door 14 (e.g. the second door 14b) is arranged in the open position 18, the display panels 20 may be spatially divided over a door opening 30 disposed along the perimeter edge 24. In this configuration, the controller of the display apparatus 12 may still operate each of the display panels 20 independently and/or in combination. For example, the controller of the display apparatus 12 may control each of the display panels 20 to sequentially display information that may emphasize or demonstrate motion of one or more of the first door 14a or the second door 14b. Additionally, the spatial separation over the door opening 30 disposed between the doors 14 may be applied by the controller to emphasize an apparent viewing region (i.e. a space occupied by the display panels 20). Similarly, the controller may independently control regions 32 of each of the display panels 20 such that the display apparatus 12 illuminates in a variety of patterns or sequences displayed on each of the regions 32 independently. In this way, the display apparatus 12 may provide for flexible operation of each of the display panels 20 in the closed position 16, the open position 18, and intermediate positions therebetween.

As demonstrated in the exemplary embodiments, the first door 14a may be a conventional hinge-mounted door and the second door 14b may be a sliding door configured to glide along a track 34. In this configuration, the second door 14b may be arranged adjacent to the first door 14a and be configured to translate along the track 34 to arrange the display panels 20 in side-by-side on an exterior surface 36 of the vehicle 10. In this way, the disclosure may provide for the display apparatus 12 to be implemented in a variety of configurations on the vehicle 10. Though described as a sliding door and a hinge-mounted door, each of the doors 14 herein may be implemented in a variety of configurations without departing from the spirit of the disclosure.

Figure 2:
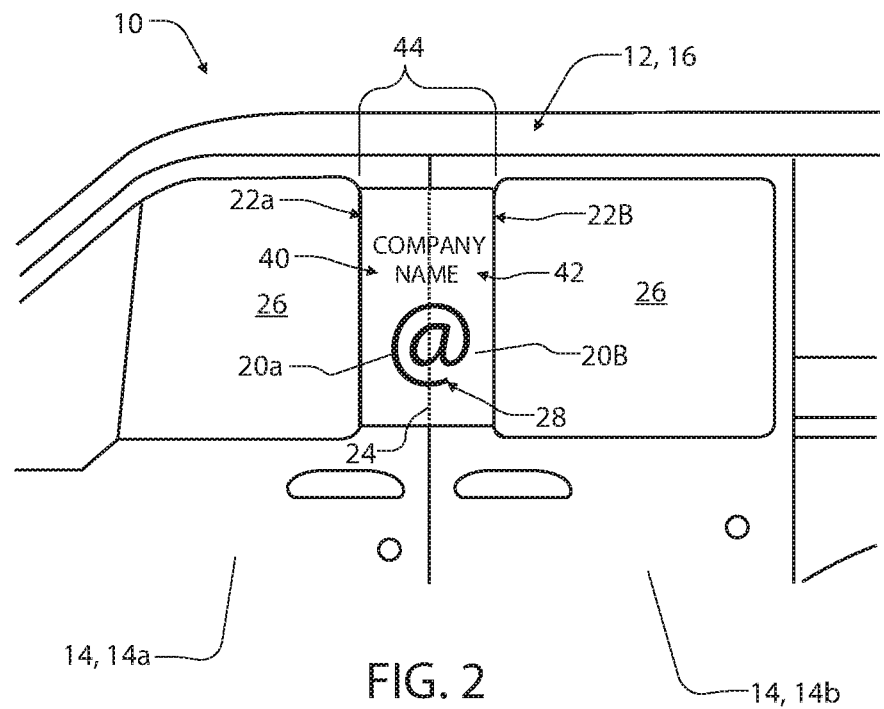
FIG. 2 is a detailed side profile view of a display apparatus disposed on a plurality of vehicle doors.

Referring now to FIG. 2, a detailed view of the display apparatus 12 is shown demonstrating the visual information 28 as a continuous representation of image data distributed contiguously over the first display panel 20a and the second display panel 20b. In operation, the controller of the display apparatus 12 may be configured to control the first display panel 20a to display first image data 40 while controlling the second display panel 20b to display second image data 42. The first image data 40 and the second image date 42 may correspond to portions or regions of a third image data 44 or combined image data. Accordingly, in operation, the controller of the display apparatus 12 may be configured to process the third image data 44 or combined image data and divide the content of the third image data 44 into separate regions, which may comprise resolutions or aspect ratios corresponding to the proportions of each of the display panels 20. That is, the controller may be configured to process the third image data 44 (e.g. combined image data) into a first portion (e.g. the first image data 40) and a second portion (e.g. the second image data 42) such that the combined image data 44 is contiguously displayed on each of the individual display panels 20. In this way, the display apparatus 12 may be operable to display the combined image data 44 continuously across the perimeter edge 24 dividing the first display panel 20a and the second display panel 20b.

Figure 3:
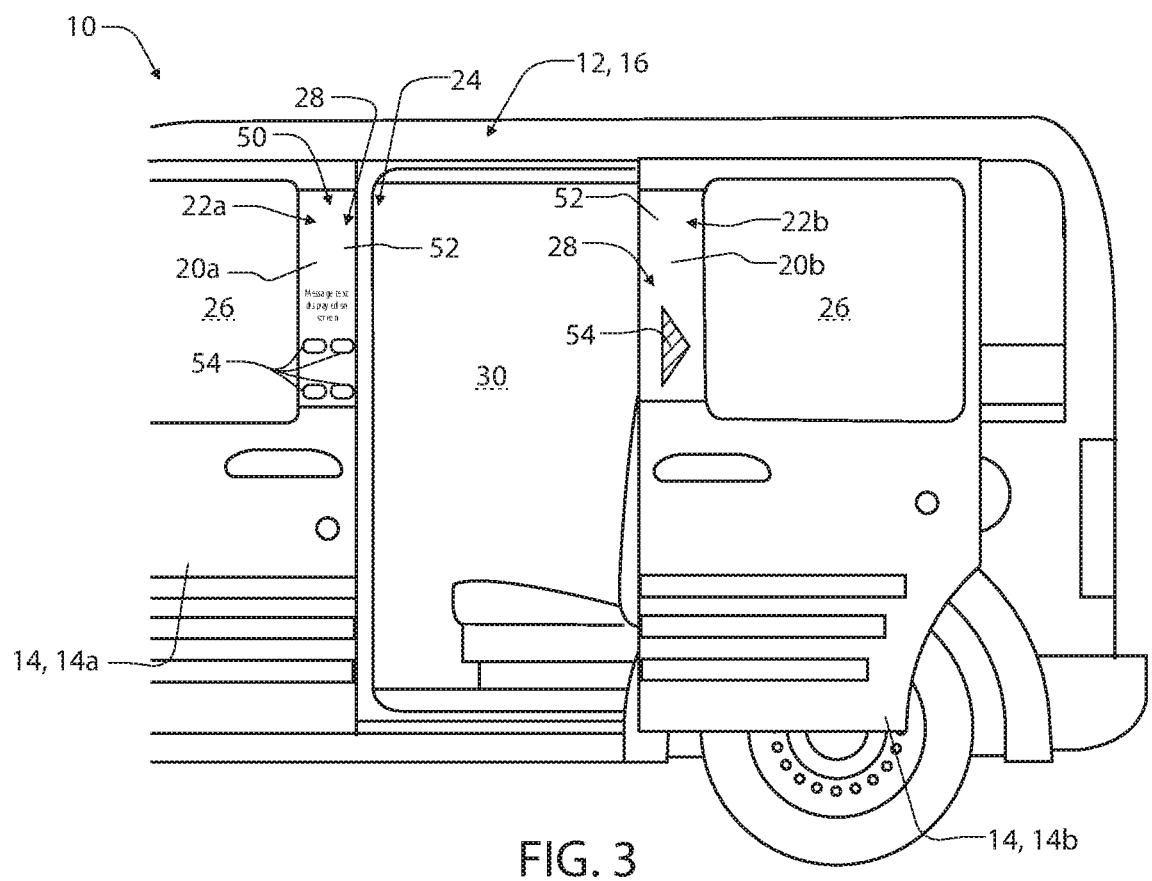
FIG. 3 is a detailed side profile view of a display apparatus disposed on a plurality of vehicle doors.

Referring now to FIG. 3, in some embodiments, the display apparatus 12 may be configured to operate a user interface 50. For example, in some embodiments, the display apparatus 12 may comprise one or more touch or proximity sensors configured to identify a location of an object in proximity to a display surface 52. In such configurations, the controller of the display apparatus 12 may generate and/or present a plurality of virtual inputs 54 which may be programmed to control one or more operations of the doors 14 and/or various systems of the vehicle 10 in response to the detection of a proximate object. In operation, the display apparatus 12 may display the virtual inputs 54 based on one or more operating conditions of the vehicle 10 and/or ambient conditions of the environment proximate the vehicle 10. For example, the controller of the display apparatus 12 may display the virtual inputs 54 in response to the vehicle 10 being engaged in a park configuration. Additionally, in response to detections communicated by one or more sensors (e.g. a rain sensor, ambient light sensor, windshield wiper activation, etc.), the controller of the display apparatus 12 may selectively display the virtual inputs 54 to avoid unintentional inputs that may result from rain or various foreign objects or materials coming in contact or proximity with the display surface 52. Accordingly, the display apparatus 12 may be configured to operate in a variety of environments and provide a variety of beneficial functions to control the doors 14 and/or various systems of the vehicle 10.

Figure 4:
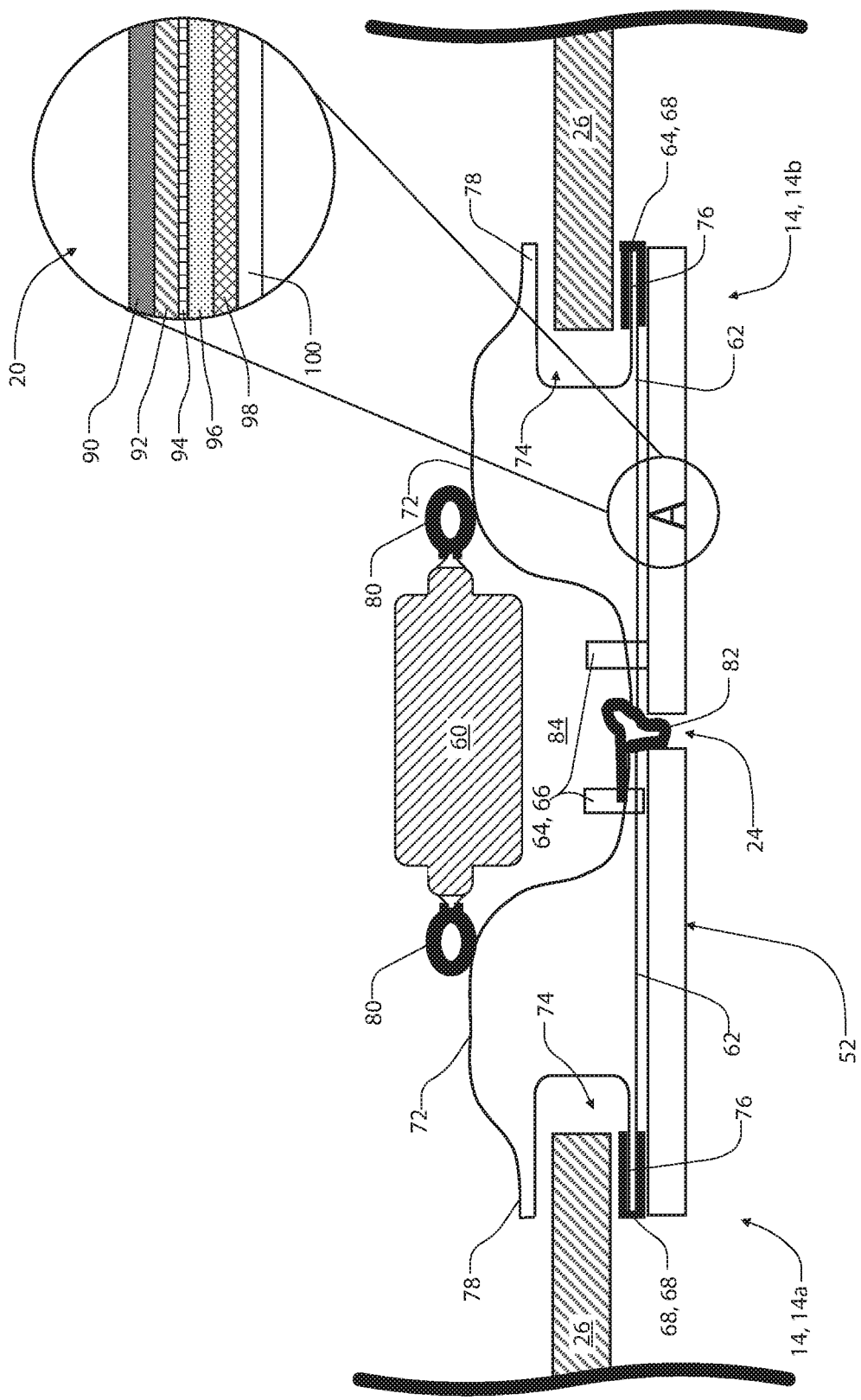
FIG. 4 is a top cross-sectional view of a display apparatus in connection with a plurality of doors of a vehicle.

Referring now FIG. 4, exemplary structural details of the display apparatus 12 are discussed in reference to a cross-sectional view of the first door 14a, the second door 14b, and a support pillar 60 (e.g. a B-pillar) disposed therebetween. Additionally, detailed section A of FIG. 4 demonstrates a cross section of the display apparatus 12, which may be formed by a plurality of layers as shown. As demonstrated in FIG. 4, each of the display panels 20 may be connected to an outer panel 62 of the door 14 via one or more connecting features 64. The connecting features 64 may comprise one or more pins or fasteners 66, as well as hooks or clips 68, which may be in connection with one or more portions of outer panel 62. In this configuration, the display panels 20 forming the display apparatus 12 may connect to an outer surface of the outer panel 62 for incorporation on the exterior of the vehicle 10.

In some embodiments, the doors 14 may be formed by an inner panel 72 in connection with the outer panel 62. Between the inner panel 72 and the outer panel 62, a glass channel 74 may be formed between an outer weld flange 76 and an inner weld flange 78. Each of the windows 26 of the doors 14 may be configured to slide open and closed guided along the glass channel 74. In the closed position 16, as shown, the inner panel 72 of each of the doors 14 may be in contact with a door seal 80, which is further in connection with the support pillar 60. The support pillar 60 may extend along the perimeter edge 24 and the door seals 80 may be configured to prevent infiltration into a passenger compartment of the vehicle 10. Finally, in some embodiments, a margin seal 82 may be disposed between the first display panel 20a and the second display panel 20b along the perimeter edge 24. The margin seal 82 may be in connection with the perimeter edge 24 of one or more of the first door 14a, the second door 14b, the first display panel 20a, and/or the second display panel 20b. In this configuration, the margin seal 82 may provide for a protective cushion between the display panels 20 and also limit the infiltration of materials into a door jamb 84 extending between the doors 14 of the vehicle 10.

Still referring to FIG. 4, and, more specifically, to detail section A, a detailed cross-sectional view of a display panel 20 of the display apparatus 12 is shown. As previously discussed, each of the display panels 20 may be formed by a plurality of stacked layers. In an exemplary embodiment, the layers may comprise a backing shell 90, which may be formed of a heat conductive material. For example, in some embodiments, the backing shell 90 may be formed of a thermally conductive plastic or polymeric material, which may be conductively connected to the outer panel 62 of the door 14. In this configuration, excess heat that may be generated by a backlight layer 92 may be conducted outward through the backing shell 90 and into a material forming the outer panel 62 (e.g. a metallic material forming the frame of the vehicle 10). In this way, the display apparatus 12 may be configured to conduct heat outward into one or more panels of the vehicle 10 to dissipate unnecessary and/or potentially damaging heat.

As previously discussed, the backlight layer 92 may be adjacent to and/or in contact with the backing shell 90. The backlight layer 92 may comprise a plurality of LEDs or other highly efficient light sources distributed over the display surface 52 of each of the display panels 20. The light sources of the backlight layer 92 may be configured to directly emit a generated light outward from the backlight layer 92 in a direct lighting configuration. In this way, the display apparatus 12 may maximize a brightness of the visual information 28 displayed on the display panels 20 such that the display apparatus 12 may function in a wide range of ambient lighting conditions (e.g. dark ambient lighting conditions to direct sunlight conditions).

In operation, the controller of the display apparatus 12 may control the backlight layer 92 to direct the generated emission of the light outward into a liquid crystal display layer 94. The display apparatus 12 may selectively transmit the light generated by the backlight layer 92 through the liquid crystal display layer 94 outward into one or more of a heater layer 96, a touch sensor layer 98, and/or a protective layer 100. In this configuration, the display apparatus 12 may provide for each of the display panels 20 to form robust display screens, which may be controlled to not only display the visual information 28, but, also, provide for the user interface 50 and various additional beneficial features as discussed herein.

The heater layer 96 may be implemented as a thin film comprising a plurality of heater strips which may be formed by indium tin oxide (ITO), a conductive film or ink (PDOT), and or various other suitable materials. The touch sensor layer 98 may be implemented as a capacitive sensor or various other forms of proximity sensors and may form a matrix of detection regions distributed over the display surface 52 of each of the display panels 20. Finally, the protective layer 100 may correspond to a scratch and/or impact resistant glass or similar transparent material (e.g. Gorilla® glass, Willow® glass, etc.) and may comprise one or more coatings configured to prevent dust and/or contaminant buildup (e.g. a titanium dioxide coating). Accordingly, as discussed herein, the display panels 20 of the display apparatus 12 may provide for a highly effective visual display that may be operable to provide various user interface functions and communicate visual information from the exterior of the vehicle 10.

Figure 5:
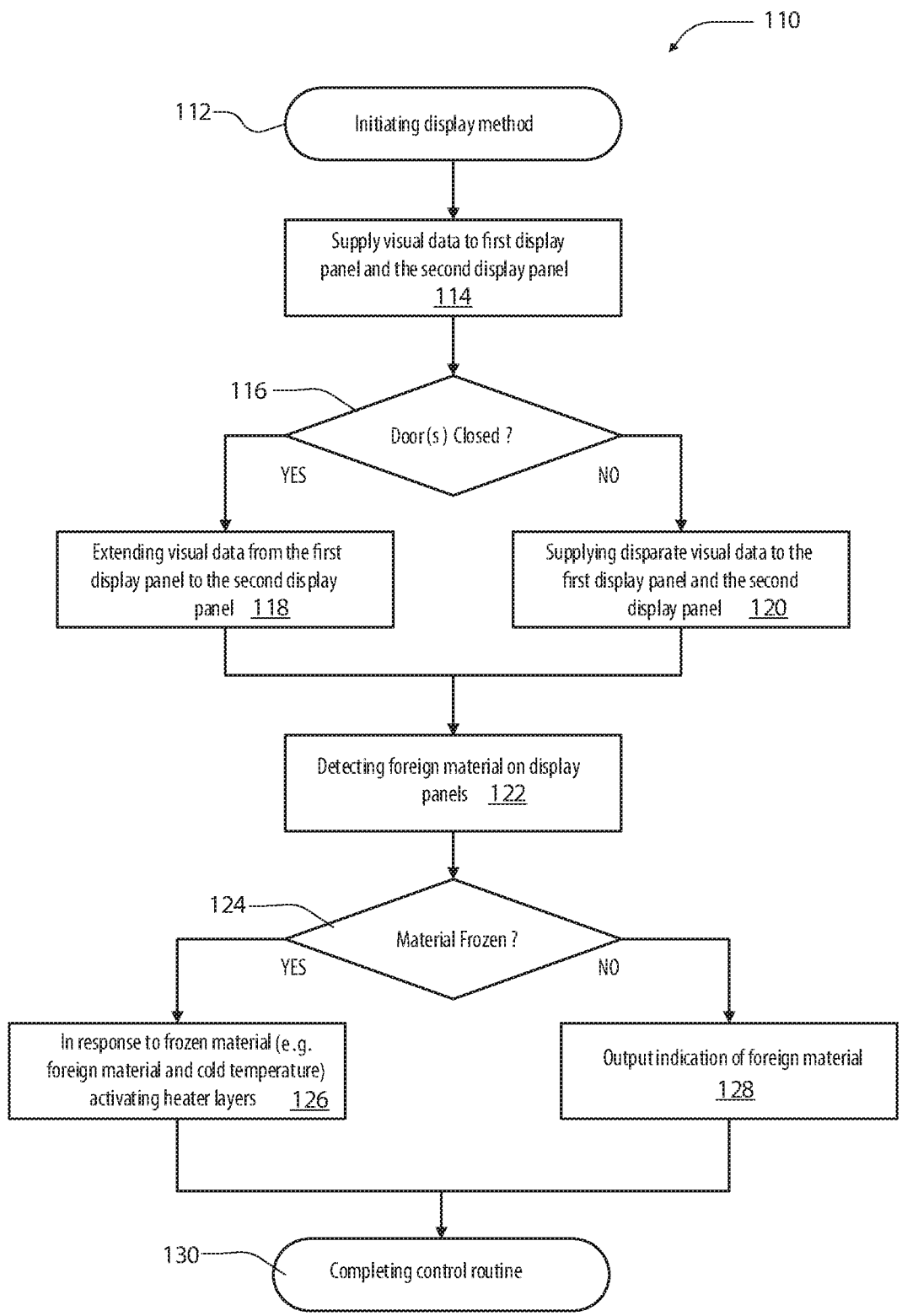
FIG. 5 is a block diagram of a method for controlling a display apparatus.

Referring now to FIG. 5, a flowchart is shown demonstrating a method 110 for controlling the display apparatus 12. The method 110 may begin in step 112 by initiating the display apparatus 12 in response to one or more operating conditions of the vehicle 10. The method 110 may continue by supplying visual data to one or more of the first display panel 20a and the second display panel 20b (114). During operating of the display apparatus 12, the controller of the display apparatus 12 may detect a condition (e.g. the closed position 16, the open position 18) of the doors 14 (116). If the doors 14 are identified by the controller as being arranged in the closed position 16, the method 110 may continue by extending the visual information 28 continuously across the first display panel 20a and the second display panel 20b (118). Additionally, if the controller identifies that one or more of the doors 14 is arranged in the open position 18, the controller of the display apparatus 12 may supply disparate, unrelated, or non-continuous visual data to each of the first display panel 20a and the second display panel 20b (120). As described herein, the disparate or different visual data may correspond to data that is not contiguous or continuous across the perimeter edge 24 dividing the display panels 20. In this way, the controller of the apparatus 12 may be configured to flexibly display the visual information 28 in a variety of ways to suit various applications.

In operation, the method 110 may further provide for the detection of one or more foreign materials on or in contact with one or more of the display panels 20 (122). In some embodiments, the controller may be configured to detect the foreign material on or in contact with the display surface 52 of the display panels 20 based on a signal supplied by the touch sensor layer 98 (e.g. a capacitive sensor layer disposed in the display panels 20). In response to such a detection, the method 110 may continue to make an inference as to whether or not the foreign material on the display panel 20 is frozen (124). The inference or determination as to whether or not the foreign material on the display panel 20 is likely to be frozen may be identified by the controller based on a temperature or environmental temperature proximate to the vehicle 10. The controller may be configured to identify the environmental temperature based on a signal communicated by one or more temperature sensors, which may be incorporated as integral components of display apparatus 12 or otherwise in communication with the display apparatus 12 (e.g. via a communication bus of the vehicle 10). Additional aspects of the controller, communication bus, and various other aspects of the vehicle 10 are further discussed in reference to FIG. 6.

Based on the determination or inference in step 124, of whether or not the foreign material on the display panel 20 is likely to be frozen, the controller may proceed to step 126 if the environmental temperature is below a predetermined threshold. In step 126, the method 110 may continue by activating the heater layer 96 to heat the display panel 20 in response to the inference that the material identified in step 122 corresponds to a frozen material. Alternatively, if the material is not inferred to be frozen in step 124 (e.g. the environmental temperature is above a predetermined temperature threshold), the controller may continue to step 128. In step 128, the controller of the display apparatus 12 may be configured to communicate an indication of foreign material to an operator of the vehicle 10 via one or more vehicle displays or gauges, which may be disposed in the passenger compartment of the vehicle 10. Following steps 126 and 128, the method 110 may be completed in step 130 and/or continue to operate as described throughout the operation of the vehicle 10.

Figure 6:
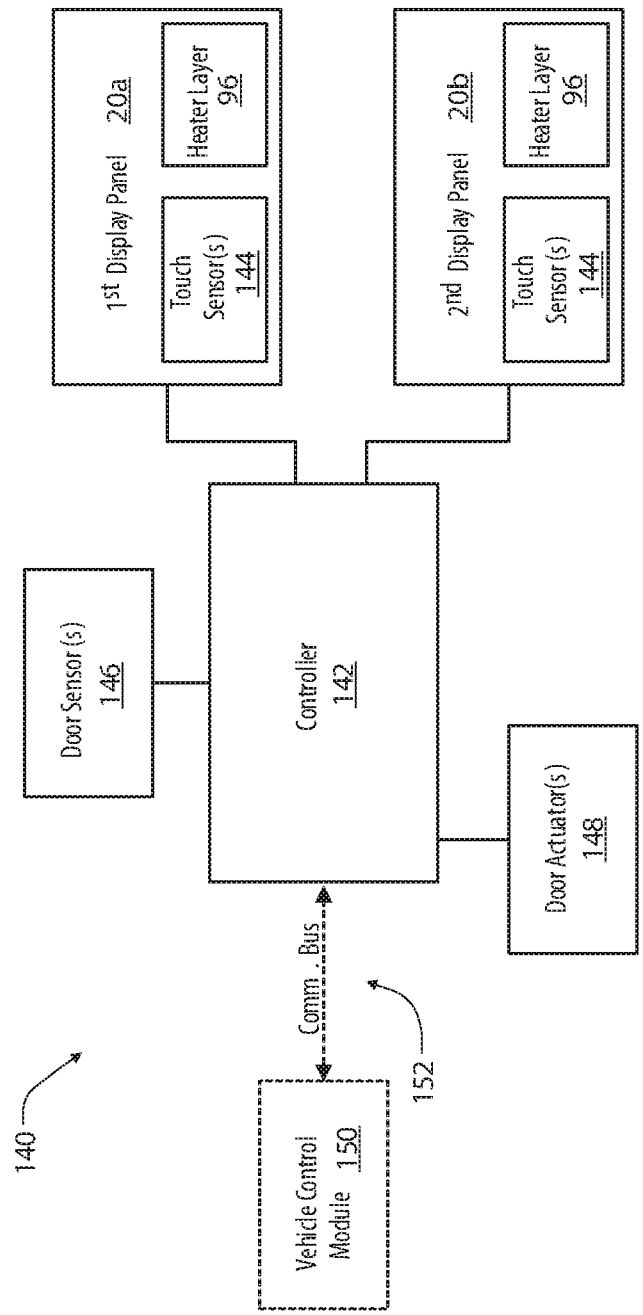
FIG. 6 is a block diagram of a system comprising a display apparatus in accordance with the disclosure.

Referring now to FIG. 6, a block diagram of a control system 140 comprising the display apparatus 12 is shown. The system 140 may comprise the controller 142 of the display apparatus 12, which may comprise one or more processors or memory devices. Such devices may include, but are not limited to, one or more circuits, processors, microprocessors, and various volatile or non-volatile memory devices. In this configuration, the controller 142 of the system 140 may provide for the various operations and routines discussed herein.

As demonstrated, the controller 142 may be in communication with each of the first display panel 20a and the second display panel 20b. The controller 142 may further be in communication with one or more touch sensors 144, which may correspond to the touch sensor layers 98 disposed in each of the display panels 20. In various embodiments, the controller 142 may also be in communication with one or more door sensors 146, door actuators 148, and/or a vehicle control module 150. In this configuration, the controller 142 may be operable to detect each of the doors 14 in the open position 18 and the closed position 16 and further control the position or motion of the doors 14 via the door actuators 148. The door actuators 148 may correspond to one or more rotational or translational actuators or motors, which may be configured to control the motion or position of each of the doors 14 as discussed herein.

In an exemplary embodiment, the controller 142 may be in communication with one or more sensors or additional vehicle systems via a communication bus 152, which may provide communication between the controller 142 and the vehicle control module 150. In this way, the user interface 50 of the controller 142 may be in communication with a variety of systems of the vehicle 10 via the vehicle control module 150. In this way, the controller 142 of the display apparatus 12 may be configured in a variety of ways to control various systems of the vehicle 10. Though specific embodiments and details of the display apparatus 12, the display panels 20, and various additional aspects of the disclosure are described in reference to specific materials and structural details, it should be understood that the detailed embodiments described herein may be combined and adapted to suit a variety of applications without departing from the spirit of the disclosure.

For purposes of this disclosure, the terms "coupled" or "connected" (in all its forms, couple, coupled, or connect, connected, etc.) may refer to the direct or indirect joining together of two components (electrical or mechanical). Such joining may be stationary in nature or movable. Such joining may be achieved in that the two (electrical or mechanical) components and any additional intermediate members be integrally formed as a unitary body with one another or with the two components. Unless otherwise indicated, such bonding may be the kind of permanent or removable or releasable.

It is also important to note that the construction and arrangement is purely illustrative of the elements shown in this disclosure as the exemplary embodiments. Although only a few embodiments of the present inventions have been described in detail in this disclosure, the skilled artisan will understand that many modifications are possible (for example, variations in terms of size, dimensions, structures, shapes and proportions of the various elements, parameter values, fastening devices, use of materials, colors, position, etc.) without materially departing from the teachings and advantages of the present subject matter. For example, elements shown as a unitary body, be constructed of multiple parts or elements shown as multiple parts may be formed as a unitary body, the operation of interfaces may be varied reversed or otherwise, the length or width of the structures and/or members or connector or other elements of the system can be varied, the nature or number of adjustment positions between the elements can vary. Accordingly, all such modifications as within the scope of the present innovations are included. Other substitutions, modifications, changes and omissions made in design, are made in the operating conditions and arrangement of the preferred and other exemplary embodiments without departing from the spirit of the present innovations.

It will be appreciated that any processes or steps within the described processes with other processes disclosed or described steps can be combined to form structures within the scope of the present disclosure. The disclosed herein exemplary structures and processes are purely illustrative and should not be construed as limiting.

What is claimed is:

1. An exterior display apparatus for a vehicle comprising:
a first display panel in connection with a first door trim portion; and
a second display panel in connection with a second door trim portion adjacent to the first trim portion;
wherein each of the display panels comprises a touch sensor and a heater layer distributed over a display surface; and
a controller in communication with a temperature sensor configured to detect a temperature proximate to the vehicle, wherein the controller is configured to:
detect a material on the display surface in response to a signal communicated from the touch sensor;
infer that the material is a frozen material based on the temperature; and
activate the heater layer in response to the frozen material.

2. The display apparatus according to claim 1, wherein each of the door trim portions are disposed along a perimeter edge of a door.

3. The display apparatus according to claim 2, wherein at least one of the door trim portions is disposed between the perimeter edge of the door and a window forming a portion of the door.

4. The display apparatus according to claim 2, wherein the perimeter edge forms a shared boundary between the first display panel and the second display panel along the perimeter edges of the doors.

5. The display apparatus according to claim 1, wherein each of the display panels comprises a rear shell in thermal connection with an outer body panel of a door of the vehicle.

6. The display apparatus according to claim 5, wherein the rear shell comprises a thermally conductive polymeric material.

7. The display apparatus according to claim 5, wherein each of the display panels comprises a backlight layer disposed between the rear shell and the heater layer.

8. The display apparatus according to claim 1, wherein the heater layer comprises a film comprising a plurality of conductive strips distributed over the display surface.

9. The display apparatus according to claim 1, wherein the touch sensor comprises a capacitive sensor pattern distributed over the display surface.

10. A method for displaying visual data on a panel of a vehicle, the method comprising:
displaying first data on a first display panel;
displaying second data on a second display panel;
detecting a closed configuration of a plurality of vehicle doors;
in response to the closed configuration, displaying a continuous representation of a third image data contiguously over the first display panel and the second display panel;
detecting a foreign substance on at least one of a first display surface of the first display panel and a second display surface of the second display panel;
inferring that the foreign substance is frozen based on a temperature proximate the vehicle in combination with the detection of the foreign substance; and
activating a heater apparatus of at least one of the first display panel and the second display panel in response to the inference that the foreign substance is frozen.

11. The method according to claim 10, wherein the detecting the foreign substance comprises detecting via a touch screen apparatus at least one of the display panels that the foreign substance is on at least one of the first display surface and the second display surface.

12. The method according to claim 10, wherein the detecting the foreign substance comprises detecting the foreign substance via a rain sensor of the vehicle.

13. An exterior display apparatus for a vehicle comprising:
a first display panel connected to a first door trim portion;
a second display panel connected to a second door trim portion adjacent to the first trim portion, wherein each of the display panels comprises a touch sensor and a heater distributed over a display surface; and
a controller in communication with a temperature sensor configured to identify a temperature of an environment proximate the vehicle configured to:
identify a foreign object on one of the display panels via the touch sensor;
infer that the foreign object is frozen material in response to the temperature identified below a threshold temperature; and
activate the heater in response to the detection of the foreign object.

14. The display apparatus according to claim 13, wherein the controller is in communication with a defrost system and configured to activate the heater in response to a defrost state of the defrost system in combination with the detection of the foreign object.

* * * * *